J. A. DEKNATEL.
Improvement in Wooden Bird's Nests.
No. 128,538. Patented July 2, 1872.
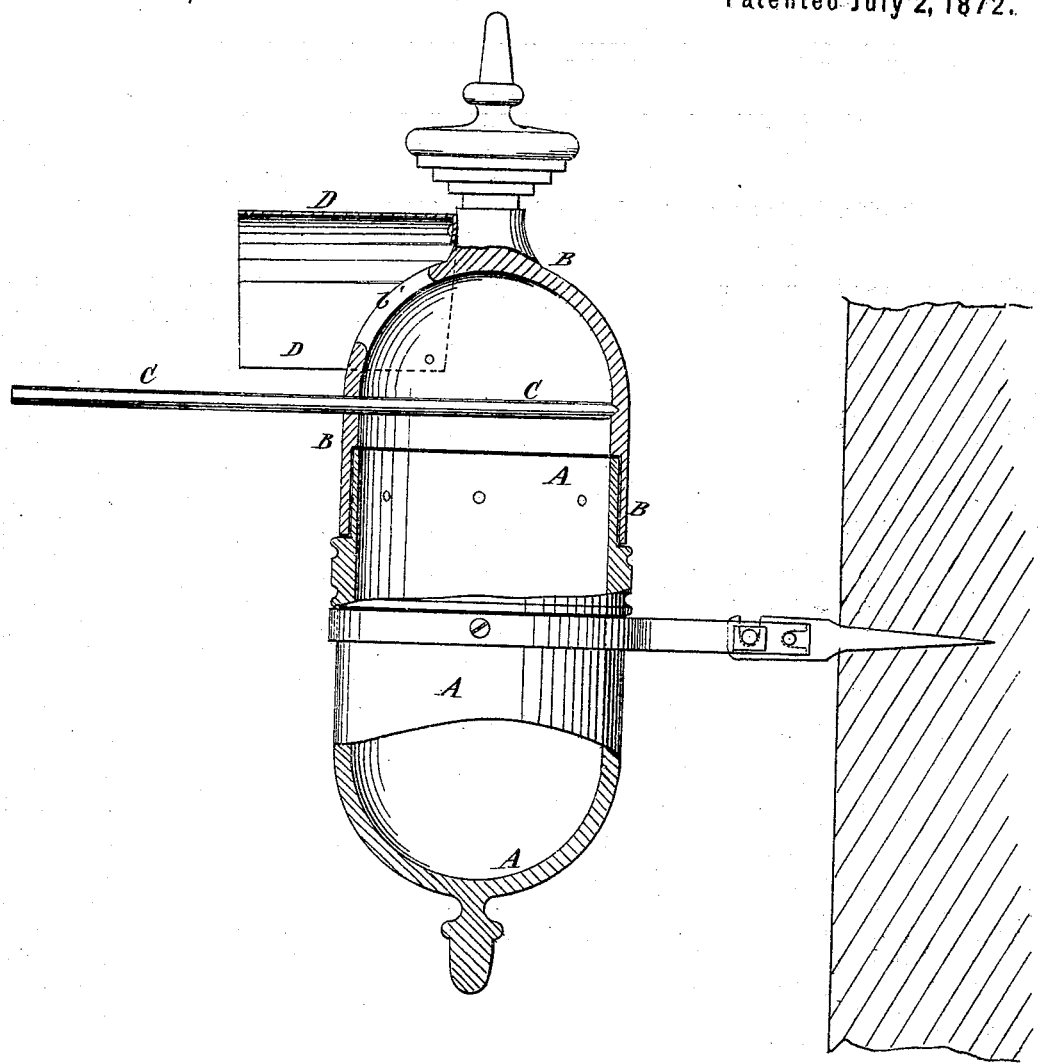

128,538

UNITED STATES PATENT OFFICE.

JOHN A. DEKNATEL, OF NEW YORK, N. Y.

IMPROVEMENT IN WOODEN BIRDS'-NESTS.

Specification forming part of Letters Patent No. 128,538, dated July 2, 1872.

Specification describing a new and useful Improvement in Wooden Bird-Nests, invented by JOHN A. DEKNATEL, of the city and county of New York and the State of New York.

In the accompanying drawing the figure is a side view, partly in section, of one of my improved bird-nests.

Similar letters of reference indicate corresponding parts.

My invention has for its object to furnish an improved wooden bird-nest, simple in construction and inexpensive in manufacture, neat, and highly ornamental in appearance, and which, from its peculiar construction, will be warm in winter and cool in summer; and it consists in wooden bird-nests turned out of wood in two pieces, and preferably japanned upon the outside and inside, as hereinafter more fully described.

A and B are the two parts of the nest, each of which is turned out of a single piece of wood. The upper edge of the lower part A, upon its outer side, and the lower edge of the upper part B, upon its inner side, are rabbeted to overlap and fit upon each other, as shown in the figure, and are secured to each other by screw-threads, screws, nails, rivets, or other convenient means. The nests upon their outer sides may be made in various forms, such as cylindrical, conical, oval, pear-shaped, &c. The upper part of the lower portion A should have a groove or ring turned upon it to receive a band for securing the nest to a tree, post, house, or other object. The nests A B may also be suspended from a limb or other support, or secured in any convenient manner. In the upper part or breast of the part B is formed a hole or opening, $b'$, for the ingress and egress of the birds. C is a rod, the inner end of which passes through a hole in the part B, just below the hole $b'$, so as to form a perch, both outside and inside of the nest, for the birds to alight upon before entering or leaving the nest. The opening $b'$ is also covered and protected by a small roof, D, as shown in the figure. The nest A B is then japanned both upon the outside and inside by the ordinary and well-known process of japanning upon wood, and may be ornamented in colors, with flowers, fruits, &c. This preserves the nests from being affected by the weather, and it also keeps bugs, worms, &c., from entering the nest.

By this construction the eggs and birds, being low down in the nest, are warm in cold weather and cool in warm weather.

Having thus described my invention, I claim as new and desire to secure by Letters Patent—

A wooden bird's-nest, made in two pieces, each turned out of a single piece of wood, substantially as herein shown and described.

JOHN A. DEKNATEL.

Witnesses:
JAMES T. GRAHAM,
T. B. MOSHER,
W. A. GRAHAM.